United States Patent [19]
Merklein et al.

[11] Patent Number: 5,377,580
[45] Date of Patent: Jan. 3, 1995

[54] PISTON WITH AN ENCOMPASSING SEAL

[75] Inventors: Dieter Merklein, Ludwigsburg; Harald Ott, Ditzingen; Barbara Schwind-Grellmann, Winnenden; Heinz Siegel, Stuttgart, all of Germany; Alexander Bareiss, North Charleston, S.C.

[73] Assignee: Robert Bosch GmbH, Stuttgart, Germany

[21] Appl. No.: 127,036

[22] Filed: Sep. 24, 1993

[30] Foreign Application Priority Data

Oct. 8, 1992 [DE] Germany ............... 4233896

[51] Int. Cl.$^6$ .................................... F16J 9/00
[52] U.S. Cl. ......................... 92/248; 92/255; 277/173; 277/176; 277/177; 277/187
[58] Field of Search ............... 92/248, 240, 249, 255; 277/173, 176, 177, 189, 187

[56] References Cited

U.S. PATENT DOCUMENTS

| 2,476,021 | 7/1949 | Bender . | |
| 2,799,523 | 7/1957 | Parker | 277/187 |
| 2,862,736 | 12/1958 | Russell | 277/173 |
| 4,998,461 | 3/1991 | Ishiwata et al. . | |
| 5,016,524 | 5/1991 | Kawai et al. | 277/176 |
| 5,118,119 | 6/1992 | Ditlinger | 277/177 |

FOREIGN PATENT DOCUMENTS

| 2005994 | 12/1969 | France . | |
| 1597230 | 7/1970 | France . | |
| 2076072 | 11/1981 | United Kingdom | 92/248 |

OTHER PUBLICATIONS

Seals and Sealing Handbook, ed. 2, GB, Morden, Trade & Technical Press Ltd., 1986.
*Encycloepedia of Plastics* pp. 32, 34 Dec. 1989.

*Primary Examiner*—Thomas E. Denion
*Attorney, Agent, or Firm*—Edwin E. Greigg; Ronald E. Greigg

[57] ABSTRACT

In a piston with an encompassing seal, which is seated slidably in a cylindrical receiving bore of a structural part such as a housing block and which can be acted upon by pressure on at least one end, the piston is intended to have a shoulder for receiving the seal. This shoulder divides a cylindrical running face of the piston of a segment having a jacket face, and a groove is formed into the jacket face for receiving a ring that secures the seal in the axial direction and also acts as a stripper ring protecting the sealing ring.

9 Claims, 2 Drawing Sheets

PISTON WITH AN ENCOMPASSING SEAL

BACKGROUND OF THE INVENTION

The invention relates to a piston with an encompassing seal, which is seated slidably in a cylindrical receiving bore of a structural part, such as a housing block, and can be acted upon by pressure on at least one end.

Pistons of this kind are used in many forms. In the present invention, this piston is intended primarily for use in a structural part such as a housing block for a hydraulic brake system. In international application WO 91/16220, for instance, a plurality of pistons are supported slidably in suitable receiving bores in a housing block for a hydraulic brake system and can be acted upon by pressure on one end, causing these pistons to slide in the receiving bore counter to the pressure of the spring.

As a rule, such pistons are seated against an inner wall of the receiving bore via a sealing ring, thereby dividing a pressure chamber from a chamber that as a rule is not acted upon by pressure. In this latter chamber, for instance as in WO 91/16220, there is a spring that returns the piston to its outset position if the pressure decreases.

An essential factor for the seal is that it be retained on the outer circumference of the piston and protected against damage. By way of example, the retention can be effected by an annular channel in the piston, but this makes piston manufacture, for instance by injection molding, more difficult. Above all unmolding proves difficult, and burrs are created on the actual running surface of the piston and on the bearing face for the seal, necessitating post-machining. The seal is also not protected against dirt and chips, for instance from a connecting conduit to a pressure storage chamber, so that damage to the seals and hence leaks can occur.

OBJECT AND SUMMARY OF THE INVENTION

A piston of this above type has the essential advantage that the ring that fits over the seal can serve both as an assembly securing means and as a scraper ring. This latter function is attained especially if the ring has an outer diameter that is approximately equivalent to the inside diameter of the receiving bore, so that in the position of use it likewise rests slidingly on an inside surface of the receiving bore. In this way, it can keep dirt and chips away from tike seal.

The present invention produces a rotationally symmetrical stepped piston that comprises two segments in terms of its outer contours. The first segment is the cylindrical running face that slidingly rests on the inside face of the cylindrical receiving bore in the structural part. It has a diameter that is greater than a diameter of the second segment, so that a shoulder is formed in which the aforementioned seal is seated. At the same time, this shoulder preferably forms a cylindrical jacket face, but it could also be embodied slightly conically. The aforementioned shoulder includes a groove for receiving the ring in this jacket face.

A mold according to the invention for producing this piston substantially comprises a basic body, with mold bodies that are movable relative to it, by which the running face, the shoulder and parts of the jacket face, in particular, are produced. As a rule, there will still be a core inside the basic body, in order to form a desired internal contour of the piston, for instance to make a blind bore for receiving a spring.

The movable parts include at least two slides, which serve to produce the remaining part of the jacket face with the groove for receiving the ring and to produce a transition to the piston bottom. The opening motion of these slides extends approximately at right angles to an axis of the piston.

The formation of injection burrs between the slides and the mold bodies is unavoidable. However, these injection burrs are now located at points where they do not present any problems. Post-machining of the piston is therefore unnecessary. The burrs are located neither on the running face nor in the region of the sealing face.

After production of the piston, the seal is applied, resting in the shoulder area. After that, the ring can be mounted on the piston by snapping into place in the groove in a simple manner. It prevents slippage of the seal, which as a rule is embodied as an O-ring, and also prevents damage.

These pistons according to the invention are preferably made of polyphenyl sulfide (PPS), which contains fillers in the form of glass fibers and mineral fillers, or are made of duroplastics. The stripper ring should be relatively wear-proof, and for that reason it may be made of polypropylene or polyamide, with or without reinforcing material.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
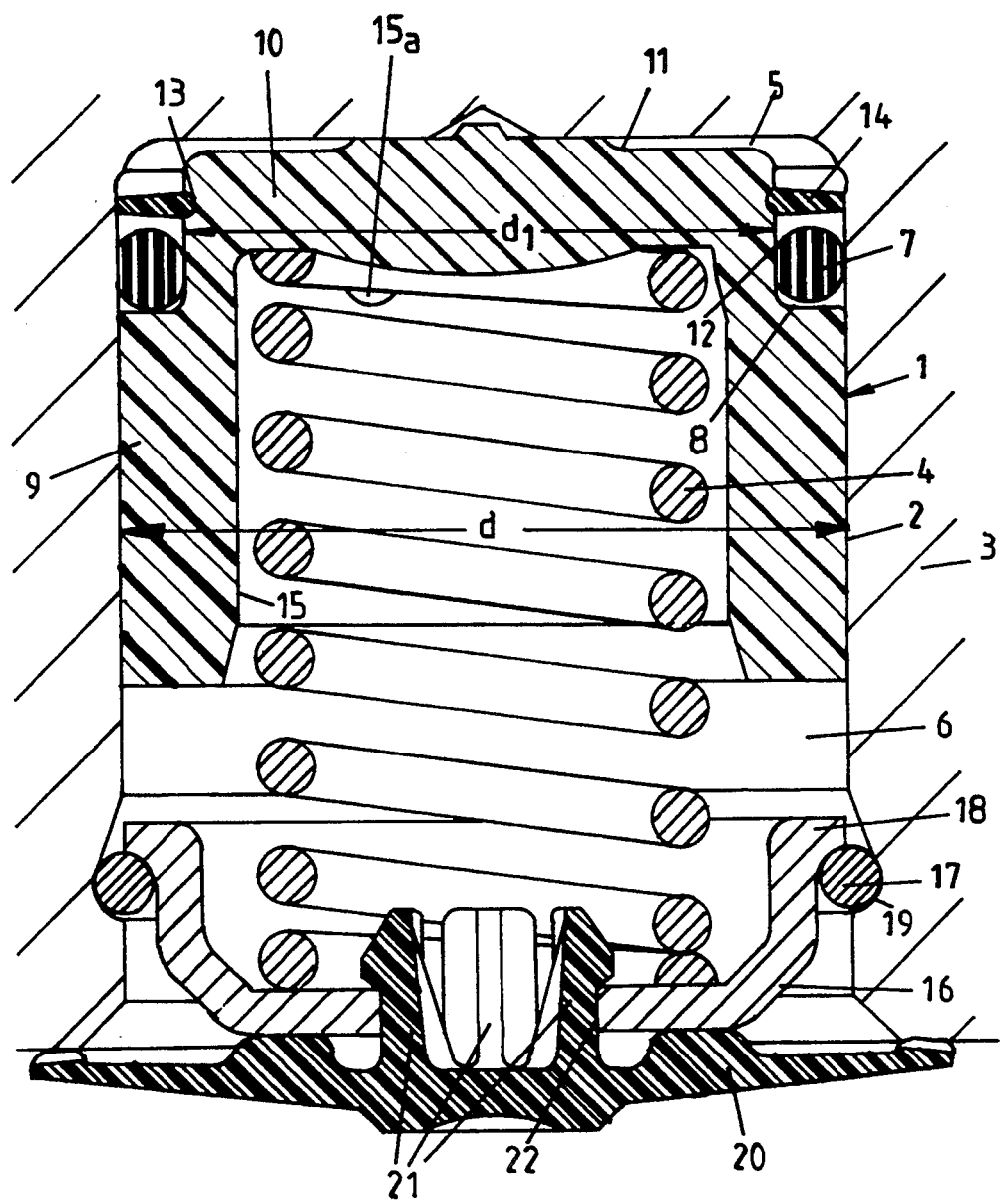
FIG. 1 is a cross section through a piston according to the invention, in a receiving bore of a structural part such as a housing block.

A piston 1 according to the invention is disposed in FIG. 1 in a cylindrical receiving bore 2 of a structural part such as a housing block 3, and in this receiving bore 2 it can slide counter to the force of a prestressed spring 4, which if the pressure decreases returns the piston 1 to the outset position shown in FIG. 1.

The piston 1 is acted upon from one end with pressure, forming a pressure chamber 5 of increasing size. Conversely, a chamber 6 decreases in size relative to the pressure chamber 5.

To seal off the pressure chamber 5 from the chamber 6, a seal 7 is provided that is seated in a shoulder area 8 of the piston 1. By means of the shoulder 8, the piston 1 is embodied as rotationally symmetrically stepped, and a cylindrical running face 9 has a diameter d that is approximately equal to the diameter of the receiving bore 2, while the shoulder 8 is followed by a cylindrical segment 10 having a diameter d1. The diameter d1 is smaller than the diameter d. The diameter d1 is then followed by a piston bottom 11.

The narrowed cylindrical segment 10 forms a jacket face 12, into which a groove 13 is formed above the seal 7. The groove 13 serves to receive a ring 14, which secures the seal 7 from falling out or slipping. This ring 14 also protects the seal against dirt and chips from the connecting conduit of a storage chamber or the like that could damage the seal. As a result, leakage that could be ascribed to damage is avoided.

A blind bore 15, with circumferentially distributed spring centering protrusions 15a, for instance three of them, is also disposed in the piston 1 and serves to receive the spring 4. On its other end, the spring 4 is supported against a spring support 16, which is retained in the receiving bore 2 of the housing block 3 by a snap ring 17. The snap ring 17 engages a flange 18 of the spring support 16 from below and is seated in a notch 19 in the receiving bore 2.

A plastic protective cap 20 is placed on the spring support 16, and in order to secure the cap snap tongues 21 engage a hole 22 of the spring support 16. This protective cap 20 covers the receiving bore 2.

Figure 2:
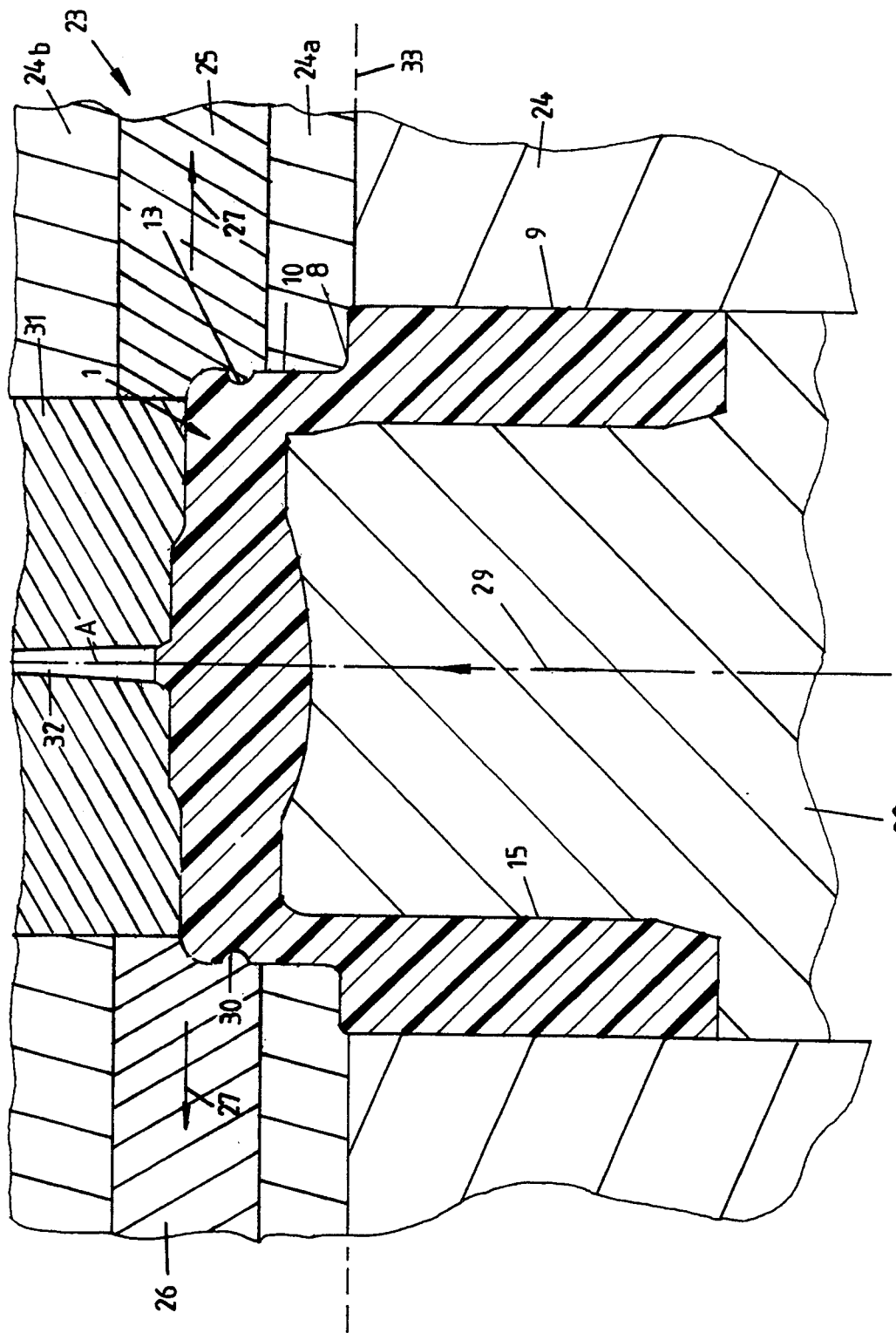
FIG. 2 is a fragmentary cross section through mold bodies for producing the piston of the invention as shown in FIG. 1.

The piston 1 of the invention is produced as shown in FIG. 2 by injection in a mold 23. The mold 23 has a basic body 24 and other mold bodies 24a, 24b, 25 and 26, by means of which the cylindrical running face 9 and the shoulder 8, as well as parts of the cylindrical segment 10, are produced in particular. To produce the grooves 13 in particular and the remaining part of the outer contour of the piston 1, slides 25 and 26 are provided as mold bodies, which when the mold 23 is opened move in the direction of the arrows 27, each into one shaftlike recess between the mold bodies 24a and 24b. The slides 25 and 26 also have a beadlike protrusion 30 for producing the groove 13. By means of this arrangement, it is possible to produce the groove 13 without producing injection burrs either on the cylindrical running face 9 of the piston or in the sealing face region. Accordingly, post-machining is unnecessary.

An injection mold part 31 with an injection conduit 32 for the thermoplastic pierces the mold body 24b. The slides 25 and 26 meet the injection mold part 31 from the side, so that any burr that might be produced here again cannot have any problematic effect at the piston bottom 11.

The blind bore 15 is produced by a core 28.

Once the piston has been produced, the mold bodies are separated from the basic body along a separating line 33. The piston is then removed from the basic body 24 in the direction of the arrow 29.

As soon as the piston 1 is removed from the mold 23, the seal 7 can be slipped over the jacket face 12 as far as the shoulder 8. After that, the insertion of the ring 14 into the groove 13 takes place, as an assembly securing means; the ring 14 is embodied such that it can snap into the grooves 13 and even in the region of its outer circumference can act as a stripper ring as well.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A piston with an encompassing seal, said piston is adapted for slidably seating in a cylindrical receiving bore of a structural part and is adapted to be acted upon by pressure on at least one end, the piston (1) has a shoulder (8) for receiving the encompassing seal (7), said shoulder extends between a cylindrical outer face (9) and an end segment (10) which forms a jacket face (12) extending from an end (11) of said end segment to said shoulder (8), and a groove (13) is formed into the jacket face (12) between said shoulder (8) and said end (11) for receiving a ring (14) that secures the encompassing seal (7) in an axial direction.

2. A piston as defined by claim 1, in which the receiving ring (14) rests slidingly on a face of the receiving bore (2).

3. A piston as defined by claim 1, in which a diameter (d) of the outer face (9) is greater than a diameter (d1) of the jacket face (12) in an area of said shoulder.

4. A piston as defined by claim 2, in which a diameter (d) of the outer face (9) is greater than a diameter (dl) of the jacket face (12) in an area of said shoulder.

5. A piston as defined by claim 1, in which the ring (14) is selected from polypropylene or polyamide.

6. A piston as defined by claim 2, in which the ring (14) is selected from polypropylene or polyamide.

7. A piston as defined by claim 3, in which the ring (14) is selected from polypropylene or polyamide.

8. A piston as defined by claim 4, in which the ring (14) is selected from polypropylene or polyamide.

9. A piston with an encompassing seal, said piston is adapted for slidably seating in a cylindrical receiving bore of a structural part and is adapted to be acted upon by pressure on at least one end, the piston (1) has a shoulder (8) for receiving the encompassing seal (7), said shoulder extends between a cylindrical outer face (9) and an end segment (10) which forms a jacket face (12) extending from an end (11) of said end segment to said shoulder (8), and a groove (13) is formed into the jacket face (12) for receiving a ring (14) that secures the encompassing seal (7) in an axial direction, said receiving ring (14) having a distance from said shoulder (8) and said encompassing ring allowing axial play to said encompassing seal (7) in relation to said piston.

* * * * *